United States Patent [19]
Emerson

[11] 3,788,454
[45] Jan. 29, 1974

[54] CHAIN BEAD DRIVE APPARATUS
[75] Inventor: William C. Emerson, Rochester, N.Y.
[73] Assignee: Xerox Corporation, Stamford, Conn.
[22] Filed: Sept. 15, 1972
[21] Appl. No.: 289,514

[52] U.S. Cl. .............................. 198/168, 198/203
[51] Int. Cl. ........................................ B65g 19/00
[58] Field of Search ....... 198/168, 203; 74/224, 225

[56] References Cited
UNITED STATES PATENTS
3,678,896  7/1972  Hewitt ......................... 117/17.5 X Primary Examiner—Richard E. Aegerter
Assistant Examiner—Joseph E. Valenza
Attorney, Agent, or Firm—James J. Ralabate et al.

[57] ABSTRACT

An improved drive apparatus for transporting particulater material including a bead chain and capstan. The capstan is constructed of a resilient cylindrical member formed with a set of teeth on one end or rim to contact and positively drive the bead chain. The chain is wrapped around the member a plurality of times such that slight slippage of the beads can occur without binding.

3 Claims, 3 Drawing Figures

FIG. I

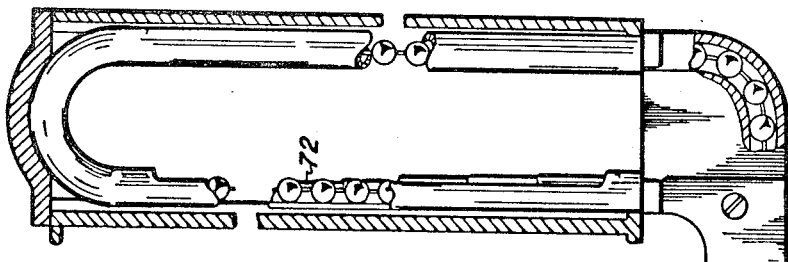
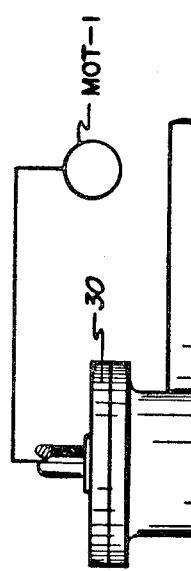
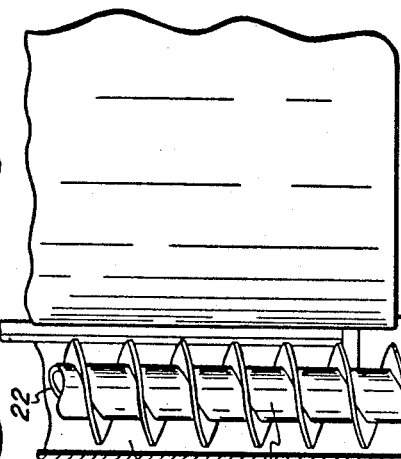
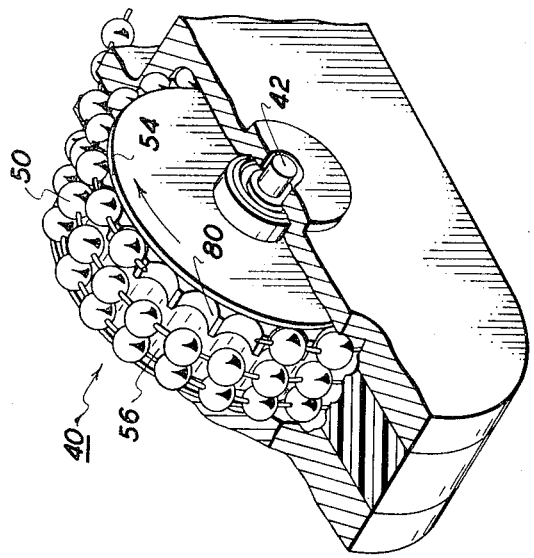
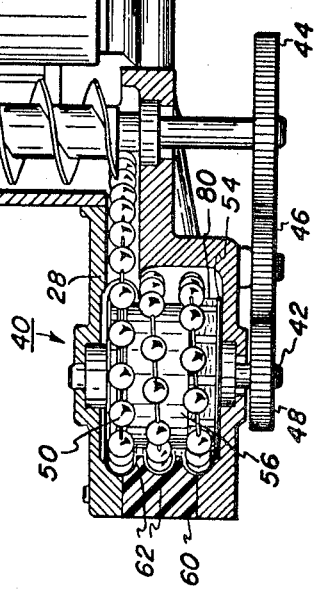
FIG. 2
FIG. 3

CHAIN BEAD DRIVE APPARATUS

This invention relates to a bead chain conveyor drive apparatus used for transporting particulate material. More specifically, the drive has an improved capstan-like device with enhanced gripping characteristics while enabling the chain conveyor freedom to deform.

The use of a bead chain to convey particulate material through a tube in which the material and the bead chain move is well known as described, for example, in U.S. Pat. No. 3,678,896. According to past efforts to apply a motive force to move the bead chain, the bead chain generally was wrapped, at least partially, around a sprocket wheel whereby movement of the sprockets positively motivated the bead chain. Inasmuch as sprockets are of a rigid construction with the pitch thereof fixed, problems occur when the bead chain being driven is stretched as through prolonged use. For example, because of pitch differences between the sprocket and bead chain, the beads or balls move circumferentially resulting in a binding action when the circumferential movement is impeded by a resisting sprocket. Alternatively, a capstan or pulley around which several wraps or bights of the chain is made has been used but without success due to slippage especially where oil or other contaminants are present, improper set-up, or chain stretch.

It is therefore an object of the instant invention to overcome the aforementioned disadvantages.

It is another object of the instant invention to drive a bead chain with an efficient and reliable motion imparting assembly.

It is a further object of the instant invention to drive a bead chain with a system which does not stretch or otherwise damage the chain while enabling a substantially positive drive.

It is a further object of the instant invention to transport particulate material with a bead chain driven through a capstan-like device with improved gripping characteristics notwithstanding the presence of oil and other contaminants.

A further object of the instant invention is to transport particulate material with a bead chain driven through a capstan arrangement without causing excessive wear.

For a better understanding of the instant invention as well as other objects and further features thereof, reference is made to the following detailed description of the invention to be read in conjunction with the accompanying drawings wherein:

FIG. 2 is a plan view of part of the toner reclaiming system shown in FIG. 1 with parts removed for clarity and FIG. 3 is an enlarged perspective view of the capstan and a portion of the bead chain associated therewith as shown in FIGS. 1 and 2.

Figure 1:
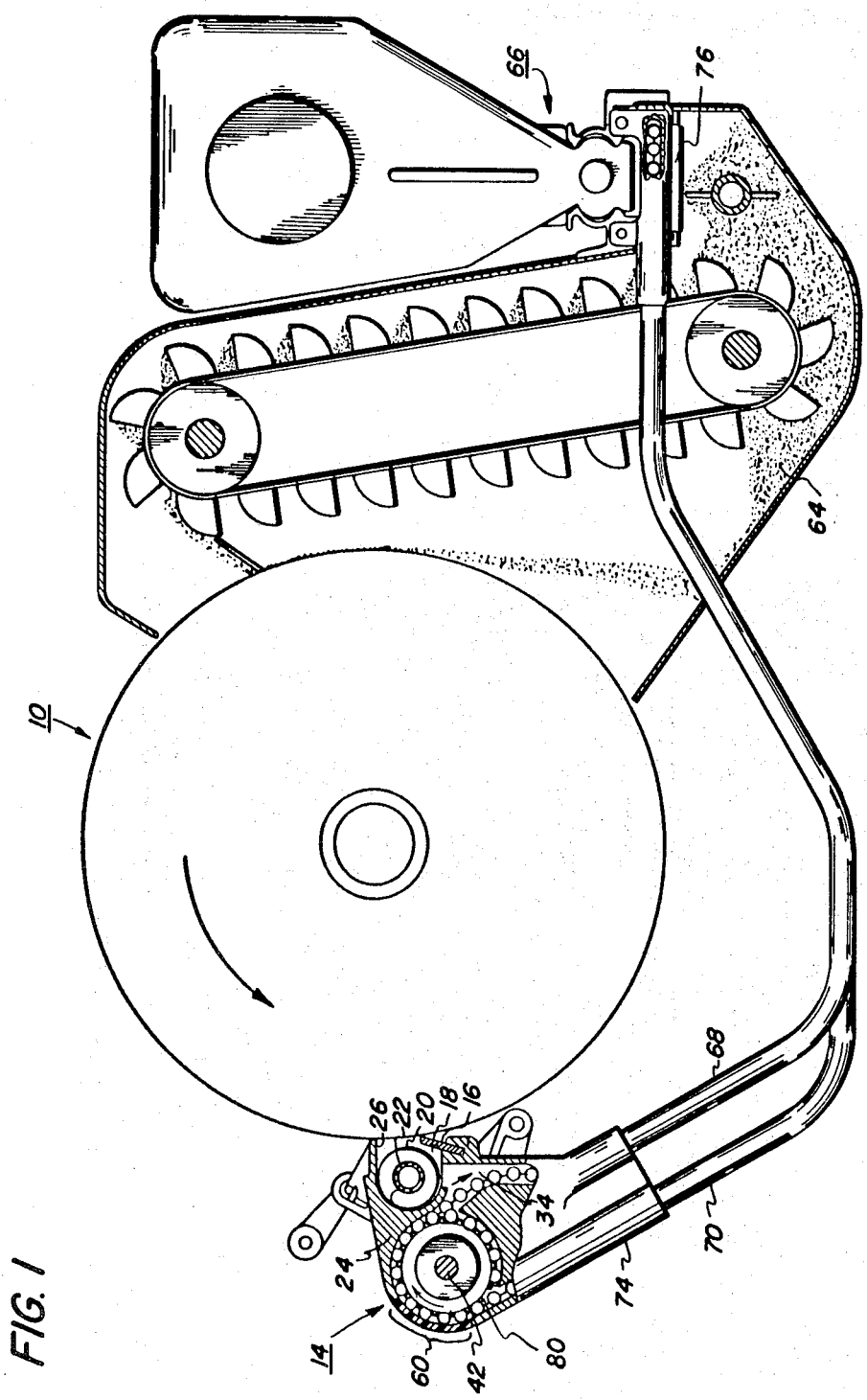
FIG. 1 is a side elevation in partial section showing a xerographic machine including a drum cleaning station, the xerographic development system and the associated elements of the toner reclaiming system as well as the bead chain and bead chain drive constructed in accordance with the instant invention.

Shown in FIG. 1 is a portion of a continuous and automatic xerographic reproducing machine which is described for example in copending application Ser. No. 838,816 filed July 3, 1969 in the name of Dennis P. Gerbasi. The reproducing apparatus includes a xerographic plate or drum 10 including a photoconductive layer of a light responsive material on a conductive backing and formed in the shape of a drum which is journaled in the frame of the machine by means of a shaft. The xerographic plate is rotated in the direction indicated in FIG. 1 to cause the drum surface to pass sequentially through a plurality of xerographic processing stations.

For the purpose of the present disclosure, the several xerographic processing stations in the path of movement of the drum surface may be described functionally as follows:

A charging station at which a uniform electrostatic charge is deposited on the photoconductive layer of the xerographic drum;

An exposure station wherein a light or radiation pattern of an original document to be reproduced is projected onto the drum surface to dissipate the charge thereon in the exposed areas to form a latent electrostatic image;

A development station at which a xerographic developing material including carrier granules electrostatically supporting toner particles possessing an electrostatic charge opposite to the charge on the drum surface is cascaded over the moving drum surface whereby toner particles adhere to the latent electrostatic image to make it visible in the configuration of the original document being reproduced;

A transfer station at which the xerographic powder image is electrostatically transferred from the drum surface to a final support material to which it will be fixed for forming the final copy; and A drum cleaning and toner collecting station whereat the drum surface is wiped with a doctor blade to remove residual toner particles remaining thereon after image transfer and whereat the removed toner is collected for reuse in the xerographic process.

This description of the xerographic stations is considered adequate for the purposes of the instant application. Further details thereof may be had by reference to the aforementioned Gerbasi application.

At the drum cleaning station 14, a doctor blade 16 formed of a flexible material is positioned to remove residual toner particles from the moving xerographic surface which were not transferred to the backing sheet at the transfer station. By positioning the doctor blade slightly below the horizontal center line of the drum surface and providing with a slight back rake, the residual toner material, which is particulate in nature, will be forced to fall to the backside of the blade, that is to the side away from the photoconductive surface.

Upon being removed from the drum, the toner falls into an open side channel 18 adjacent to and running parallel with the axis of the drum. A screw type conveyor 20 mounted upon a shaft 22 is journaled for rotation in an end plate 24 and cover plate 26 of the machine. The conveyor is supported in the open side channel 18 in substantial parallel relationship to the doctor blade and is arranged to convey the toner particles removed from the drum surface toward the recovery drive housing 28. The open side channel is closed at one end by means of an end plate 30 while the opposite end of the channel is securely mounted in the drive housing 32. The channel communicates with a reservoir or collecting area 34 in the housing.

A portion of the shaft 22 extends through the end plate 30 and has affixed thereto a driving gear 36. This driving gear is driven by any convenient portion of the machine and is generally indicated as MOT-1. This rotates the conveyor in a direction whereby the screw transports the toner material laterally from behind the blade into the reservoir area 34 where it is collected.

In accordance with the present invention an improved bead chain drive capstan 40 is rotatably mounted on the shaft 42 which is journaled for rotation in the drive housing 32. The capstan is generally in the shape of a right circular cylinder having a horizontal axis and is driven from the drive MOT-1 through screw conveyor shaft 22. A driven gear 44 mounted on the end shaft 22 turns an intermediate gear 46 which in turn drives the capstan drive gear 48 in the desired clockwise direction as seen in FIG. 1.

Passing around the surface the capstan 40 is the endless bead chain 50. The capstan is arranged to engage, and guide the bead elements of the chain irrespective of stretching or shrinkage and move it in the direction of the capstan rotation as will become more apparent hereinafter.

The present capstan is preferably formed of a hollow sleeve member 56 of a flexible material which is formed on one end with a series of teeth 80. Any suitable material may be used as a sleeve material such as soft plastic. The sleeve may preferably be of a urethane which is slightly resilient to assist in the motion imparting property of the capstan. The formation of teeth 80 made of flexible material on one end has been found to be extremely desirable to transmit the proper frictional force to the bead chain being driven thereby without stretching or otherwise damaging the bead chain. At the same time, any stretching of the bead chain can be accommodated over the flexible sprocket teeth. In the preferred mode of operation, the bead chain 50 is wrapped around the sleeve member 56 of the capstan 40 about two and one half times or 900° as well as teeth 80 to achieve a strong positive frictional driving contact without excessive wear.

Positioned adjacent and spaced from a portion of the sleeve remote from the areas wherein the bead chain comes to and leaves the spool is a guide member 60 to retain the various loops or wraps of the bead chain separate from each other during rotation of the capstan and movement of the chain. This guide has fingers 62 extending between the various runs of the bead chain which cooperates with the flanges of the capstan and the adjacent supporting frame portions for the capstan to retain the bead chain loops separate and prevent them from binding one against another. A preferred guide material having the proper self-lubricating properties is a Teflon filled Delrin commercially available as Fulton 404. The fingers are spaced from the sleeve a distance less than the diameter of the beads so that the beads will ride within the tunnels formed therebetween.

As employed in the disclosed embodiment, the residual toner which is collected in the reservoir area 34 of the drive housing is transported back to the sump area 64 of the development station 66 by means of the conveyor system made up of bead chain, capstan, drive and supporting elements as well as the supply and return tubing 68 and 70. The various parts making up the conveyor system are mated together to form a continuous, substantially closed conduit.

The tubing has a uniform inside diameter and runs from the reservoir area through the machine, across the width of the sump and returns to the reservoir. As illustrated, the endless bead chain passes over the capstan and is arranged to move through the conduit along its entire path of travel. The inside diameter of the tubing is slightly larger than the diameter of the beads so that the beads will move smoothly through the conduit but yet be capable of pushing the particulate toner material along therewith. Aperture means 72 in the tubing above the developer sump permit the release of the transported toner from the tubing to the sump.

In operation, the endless chain moves downwardly through the collected toner material in the reservoir. The beads of the chain mechanically force the particulate toner powder downwardly into supply tubing 68. The tubing is secured in operative relation with the drive housing by pressing the tubing firmly into the receiving adaptors 74 positioned in the bottom of the drive housing plate. The opposite end of the tubing is similarly connected above the sump by connectors 76. Supply tubing 68 and the return tubing 70 are preferably constructed of a flexible plastic material which is conveniently routed from the toner cleaning and collecting apparatus to the development station through the machine so as to avoid interfering with the operation of all stationary and moving machine components. Clearly, the above arrangement gives the present apparatus an extremely wide flexibility of usage in that the toner cleaning and collecting area can be positioned in any remote positions in the machine and still be able to operatively communicate with the development system.

The toner transmitted to the developer housing through the above described system is mixed with the developer in the sump along with the toner supplied thereto through a toner dispenser 78 to thereby supplement the toner of the developer lost through the development of images.

By employing disclosed capstan and bead chain arrangement less stringent construction requirements are placed on the bead chain since minor increases of its length through its stretching as caused through prolonged use will have little effect in the driving ability of the system. And since the motion is imparted through the bead chain by its frictional contact with surface of the spool together with teeth 80 some slippage can occur from the bead chain and the surface of the sleeve, so that excess drag on the system will not strip the gears or damage the driving motor or blow a fuse. On the other hand, due to the gripping characteristics of the teeth formed on the sleeve a positive drive is maintained irrespective of bead chain stretching or shrinking or other causes such as oil or other contaminants.

As can be understood from the foregoing, the assembly of the instant invention constitutes a highly efficient means for transporting any particulate material along a predetermined course by a bead chain through the driven capstan. The system is generally insensitive to slack and stretch of the bead chain and thus operates more efficiently than the sprocket systems in former devices.

While the instant invention has been described with reference to the structure disclosed herein, it is not in-

I claim:

1. In a transport mechanism for moving particulate material including a bead chain arranged to move along an endless path, a tubing encompassing said bead chain along a portion of said endless path for confining a particulate material being transported therealong by the moving bead chain, an improved drive apparatus including, a cylindrical resilient member engaging a plurality of wraps of said bead chain and being formed along one end with a set of teeth for engaging and transmitting positive drive to said bead chain to transport said chain and said particulate material through said tubing while accommodating bead chain stretching, and guide means associated with said cylindrical resilient member for maintaining separation of said wraps of bead chain.

2. Apparatus according to claim 1 wherein said cylindrical member is a hollow sleeve made of urethane.

3. Apparatus according to claim 1 wherein said guide means includes finger portions each extending between individual wraps of said bead chain.

* * * * *